United States Patent [19]
Sakakima

[11] Patent Number: 6,078,484
[45] Date of Patent: Jun. 20, 2000

[54] THIN FILM MAGNETIC HEAD

[75] Inventor: Hiroshi Sakakima, Kyotanabe, Japan

[73] Assignee: Matsushita Electric Industrial Co., Ltd., Osaka, Japan

[21] Appl. No.: 09/058,610

[22] Filed: Apr. 10, 1998

[30] Foreign Application Priority Data

Apr. 14, 1997 [JP] Japan ................................. 9-095493

[51] Int. Cl.[7] ...................................................... G11B 5/39
[52] U.S. Cl. .................................................................. 360/324
[58] Field of Search ................................. 360/113, 324, 360/324.1, 322, 319; 324/252; 338/32 R

[56] References Cited

U.S. PATENT DOCUMENTS

| | | | |
|---|---|---|---|
| 5,598,308 | 1/1997 | Dieny et al. | 360/113 |
| 5,696,656 | 12/1997 | Gill et al. | 360/113 |
| 5,828,530 | 10/1998 | Gill et al. | 360/113 |
| 5,867,025 | 2/1999 | Allenspach et al. | 360/113 |

*Primary Examiner*—William Klimowicz
*Attorney, Agent, or Firm*—Renner, Otto, Boisselle & Sklar, LLP

[57] ABSTRACT

A thin film magnetic head includes a shield-type magnetoresistance effect (MR) head section. The shield-type magnetoresistance effect (MR) head section includes: a MR device section within a shield gap, the MR device section exhibiting a giant magnetoresistance effect; and a lead disposed in such a manner that an electric current flows in a direction perpendicular to a film surface of the MR device section. The MR device section includes first and second magnetic films with a non-magnetic insulating film interposed therebetween. The first magnetic film exhibits soft magnetic properties and is disposed at a first distance from a face of the thin film magnetic head opposing a magnetic recording medium. The second magnetic film is disposed at a second distance from the face of the thin film magnetic head opposing the magnetic recording medium such that the second distance is greater than the first distance.

11 Claims, 3 Drawing Sheets

THIN FILM MAGNETIC HEAD

BACKGROUND OF THE INVENTION

1. Field of the Invention

The present invention relates to a thin film magnetic head including a magnetoresistance effect (MR) head section.

2. Description of the Related Art

Thin film magnetic heads including a magnetoresistance head (hereinafter referred to as "MR head") section incorporating a magnetoresistance effect device have been proposed and developed. Such a conventional thin film magnetic head includes a recording head section 40 and a reproduction head section 50. As shown in FIG. 4, the recording head section 40 features a so-called inductive-type recording head, which records information on a medium by converging a magnetic field (which is generated by allowing a current to flow through coiled wire 11) onto head cores 12 and 13 and utilizing a magnetic field leaked from a recording gap 14 (which includes a non-magnetic insulating film). The reproduction head section 50 features a reproduction head of a magnetoresistance effect type, which reads a recorded signal based on the change in the resistance of a MR device section 15 that is induced by a signal magnetic field representing the information recorded on a medium.

As shown in FIG. 4, the MR device section 15 is disposed within a shield gap 17, which in turn is interposed between an upper shield 13 composed essentially of a magnetic film (also doubling as the recording head core 13) and a lower shield 16. The MR device section 15 is insulated from the upper shield 13 and the lower shield 16 by means of insulating films 18.

Because of the requirement that the shield gap length (denoted by dsg in FIG. 4) must equal to or smaller than the shortest signal wavelength to be reproduced, the on-going demand for higher recording density has necessitate drastic reductions in the thicknesses of the insulating film 18 and the MR device section 15; for example, a head having a shield gap which is narrower than 100 nm may well be demanded in the future. However, it is very difficult to fabricate an insulating film that can provide sufficient insulation at a thickness of about 50 nm or less, and this could pose a bottleneck for the realization of high density recording. In addition, the above-mentioned structure in which the MR device section 15 is sandwiched by insulating films has problems such as the charge-up phenomenon of the MR device section 15 during a reproduction operation of the head and the loss of insulation properties of the insulating films. These problems will be aggravated as the head is pushed toward higher density recording with the use of thinner insulating films.

Accordingly, a structure including a recording head section 20 and a reproduction head section 30, as shown in FIG. 3 has been proposed. A MR device section 5 and upper and lower shields 3 and 6 are interconnected by conductive layers 10 so that the upper and lower shields 3 and 6 can also function as a lead section 19 shown in FIG. 4 (Japanese Application No. 8-34557). This structure allows for an ultra-thin film construction because the conductive layers 10 can be readily formed in thicknesses of about 20 nm or less. The aforementioned problem associated with insulating films in an ultra-narrow gap is eliminated in this structure, which does not require an ultra-thin insulating film between the shield sections and the MR device section. This structure is particularly useful in the case where artificial multilayers that exhibit GMR (giant magnetoresistance effect) properties are employed in the MR device section because a larger ratio of change in magnetoresistance (hereinafter referred to as an "MR ratio") is provided in a current direction running perpendicularly to the film surfaces than in directions within the same plane. This structure is still more useful in the case where the non-magnetic film in the GMR device is an insulating film of a tunneling type because the resistance of the overall element becomes high in the direction perpendicular to the film surfaces.

In the case of adopting such a non-magnetic film in the GMR device, it is also applicable to insert insulating films between a lead section and the shields for providing insulation therebetween, instead of interconnecting the MR device section 5 and the upper and lower shields 3 and 6 with conductive layers 10 shown in FIG. 3. The reason is that such a structure allows the insulating film 18 in FIG. 4 to retain a relatively large thickness in the entire MR device section 5, which can be implemented in the form of a relatively thin film.

FIG. 2 illustrates an exemplary MR device section 25 in a thin film head incorporating the above-mentioned tunneling-type GMR film. In FIG. 2, S represents a face of the magnetic head opposing a magnetic recording medium such as a magnetic disk. L1 and L2 represent leads for a MR device section as described above. Specifically, the leads L1 and L2 are coupled to a MR device section which includes an anti-ferromagnetic film AF, a magnetic film M1 (which is magnetically coupled to the anti-ferromagnetic film AF; referred to herein as "pinned"), and a soft magnetic film M2 capable of free magnetization rotation due to being isolated from the magnetic film M1 by means of an intervening non-magnetic insulating film T.

However, the MR device section illustrated in FIG. 2 has the following problems: Since the magnetic films M1 and M2 and the insulating film T are exposed on the head surface in the structure of FIG. 2, if they come in contact with a magnetic disk, the magnetic films M1 and M2 (which usually are metal films) temporarily enter a "flow" state and therefore allow electric communication with each other, i.e., being short-circuited. As a result, the intended magnetoresistance effect, which is based on a tunneling effect across the insulating film T, is undermined so that the element cannot provide the intended characteristics. Furthermore, since the insulating film T is usually required to be an ultra-thin film (e.g., several nanometers or less), the insulating film T becomes susceptible to insulation destruction when charged-up at both ends, possibly resulting in the destruction of the entire element.

SUMMARY OF THE INVENTION

A thin film magnetic head according to the present invention includes a shield-type magnetoresistance effect (MR) head section including: a MR device section within a shield gap, the MR device section exhibiting a giant magnetoresistance effect; and a lead disposed in such a manner that an electric current flows in a direction perpendicular to a film surface of the MR device section, wherein the MR device section includes first and second magnetic films with a non-magnetic insulating film interposed therebetween, the first magnetic film exhibiting soft magnetic properties and being disposed at a first distance from a face of the thin film magnetic head opposing a magnetic recording medium, and the second magnetic film being disposed at a second distance from the face of the thin film magnetic head opposing the magnetic recording medium such that the second distance is greater than the first distance.

In one embodiment of the invention, the thin film magnetic head includes upper and lower shield metal magnetic films, each of the upper and lower shield metal magnetic films being connected to the MR device section by a non-magnetic conductive film, the upper and lower shield metal magnetic films functioning as a portion of the lead for allowing an electric current to flow into the MR device section.

In another embodiment of the invention, the second magnetic film is magnetically coupled to an anti-ferromagnetic film.

In still another embodiment of the invention, the second magnetic film is a hard magnetic film having a magnetization curve with good square feature, and a direction of a magnetic field to be detected extends in parallel to a magnetization easy axis of the hard magnetic film.

In still another embodiment of the invention, the MR device section further includes an interface magnetic film on at least one of interfaces between the first and second magnetic films and the non-magnetic film, the interface magnetic film including Co and having a thickness of about 0.1 nm or more.

In still another embodiment of the invention, the interface magnetic film is inserted between the first magnetic film and the non-magnetic film, the interface magnetic film having a thickness in the range of about 0.1 nm to about 1.5 nm.

In still another embodiment of the invention, the first film includes $Ni_xCo_yFe_z$ (where x=about 0.6 to about 0.9; y=about 0 to about 0.4; and z=about 0 to about 0.3 in terms of atomic composition).

In still another embodiment of the invention, the first magnetic film includes $Ni_{x'}Co_{y'}Fe_{z'}$ (where x'=about 0 to about 0.4; y'=about 0.2 to about 0.95; and z'=about 0 to about 0.5 in terms of atomic composition).

In still another embodiment of the invention, the first magnetic film includes an amorphous magnetic film.

In still another embodiment of the invention, the hard magnetic film has a square feature of about 0.7 or more, the square feature being defined as remnant magnetization/ saturation magnetization.

In still another embodiment of the invention, the metal anti-ferromagnetic film includes at least one of NiMn, IrMn, PtMn, and CrMn.

Thus, in accordance with the thin film magnetic head 55 of the present invention (as exemplified in FIG. 1), a magnetic film M1 (and an anti-ferromagnetic film AF) are not exposed on the magnetic head surface (i.e., located at a none-zero second distance from the magnetic head surface). As a result, even if the magnetic film M2 temporarily enters a flow state, the magnetic film M2 may come in contact with an insulating film T or an insulating film I, but still avoids being short-circuited with the magnetic film M1. It is preferable that the soft magnetic film M2, which is subject to magnetization rotation (inversion) due to a magnetic field generated by a signal to be detected, is located at a substantially zero distance (i.e., first distance) from a face of the thin film magnetic head opposing a magnetic recording medium (although, in general, a protection layer having a thickness of about 10 nm is provided for securing wear, resistance and lubrication). The reason is that detecting the magnetic field of the signal (recorded on a magnetic recording medium) farther away from the head surface would result in lower sensitivity and/or output. Alternatively, a lead L2 and the insulating film T shown in FIG. 1 may also be aligned with the magnetic film M1 (as indicated by the broken line) so as not to be exposed on the head surface. In the case where the magnetic film M1 is a magnetic film which is relatively unlikely to undergo magnetization rotation, e.g., a hard magnetic film, the anti-ferromagnetic film AF in an MR device section can be omitted. The leads L1 and L2 in FIG. 1 can be directly connected to a metal shield film (as in the case of FIG. 3) or insulated from the shield film by means of an insulating film. Directly connecting the leads L1 and L2 to a metal shield film is more effective in preventing problems due to a charge-up phenomenon.

In a thin film head of the above-described structure, it is preferable that a magnetic field to be detected extend substantially perpendicularly to a magnetization easy axis of the soft magnetic film M2 (which exhibits magnetoresistance effects through magnetization rotation in accordance with the magnetic field) and substantially in parallel to a magnetization easy axis of the magnetic film M1, in order to obtain an output with good linearity and low noise.

Thus, the invention described herein makes possible the advantage of providing a thin film magnetic head for ultra-high density magnetic recording, the thin film magnetic head including a highly reliable MR reproduction head with an extremely small shield gap length.

This and other advantages of the present invention will become apparent to those skilled in the art upon reading and understanding the following detailed description with reference to the accompanying figures.

DESCRIPTION OF THE PREFERRED EMBODIMENTS

Figure 1:
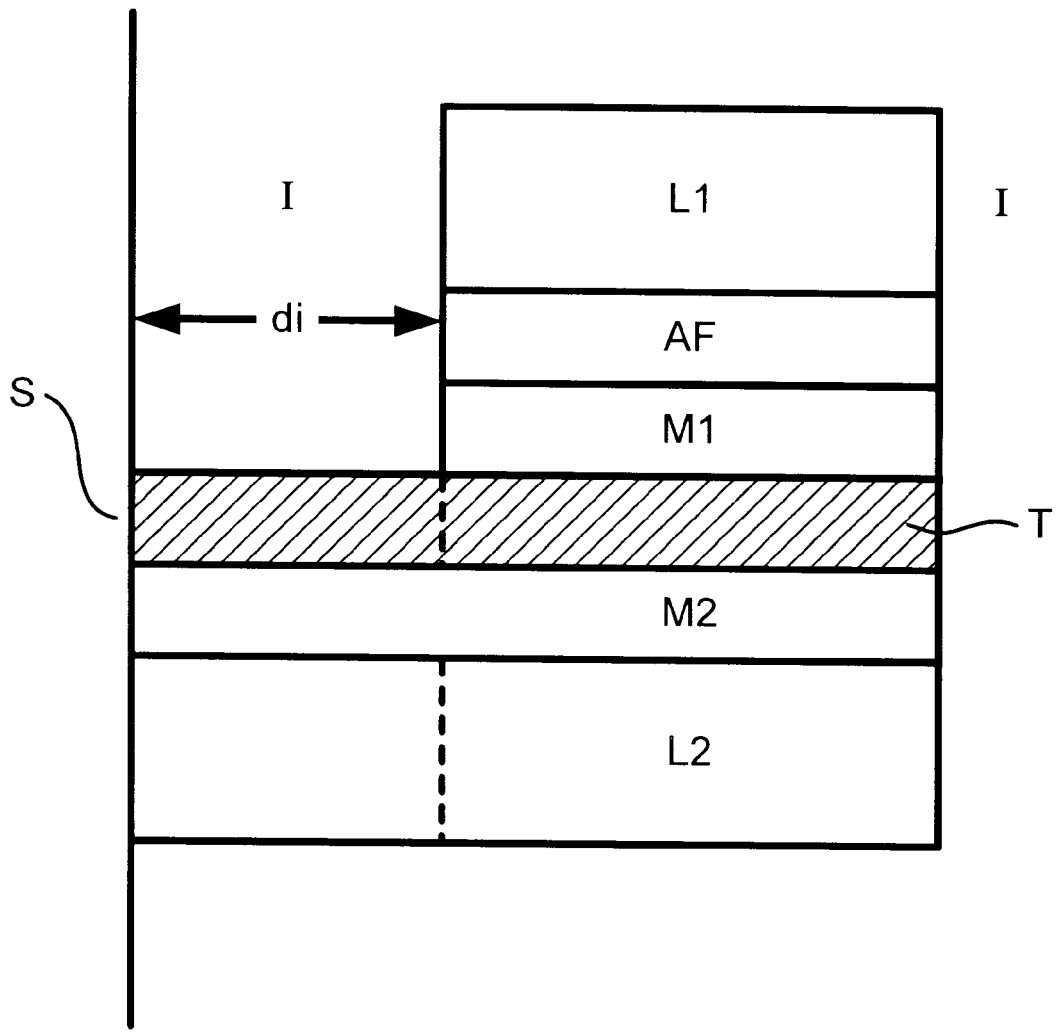
FIG. 1 is a diagram illustrating an exemplary MR device section in a thin film magnetic head according to the present invention.

Examples of artificial multilayers which exhibit appropriate GMR properties for use in a MR device section of the thin film magnetic head according to the present invention include those belonging to classes A and B below:

A) Artificial multilayers which include a hard magnetic film (having a magnetization curve with a good square feature) and a soft magnetic film as well as a non-magnetic insulating film interposed between the respective magnetic films for reducing the magnetic coupling between the magnetic films, such that a magnetic field to be detected extends substantially in parallel to a magnetization easy axis of the hard magnetic film. In a GMR film of this class, only the soft magnetic film undergoes magnetization rotation due to a magnetic field generated by a signal to be detected (while the hard magnetic film does not undergo any magnetization rotation) so that the resistance changes in accordance with the angle between the respective magnetization directions of the soft magnetic film and the hard magnetic film.

B) Artificial multilayers which include a magnetic film (which is "pinned", i.e., magnetically coupled to a metal anti-ferromagnetic film) and a soft magnetic film as well as a non-magnetic insulating film 2 interposed between the respective magnetic films for reducing the magnetic coupling between the magnetic films, such that a magnetic field to be detected extends substantially in parallel to a magnetization easy axis of the magnetic film which is magnetically coupled to a metal anti-ferromagnetic film. In a GMR film of this class, only the soft magnetic film undergoes magnetization rotation due to a magnetic field generated by a signal to be detected (while the magnetic film magnetically coupled to a metal anti-ferromagnetic film does not undergo any magnetization rotation) so that the resistance changes in accordance with the angle between the respective magnetization directions of this "pinned" magnetic film and the soft magnetic film.

Class A GMR films are characterized in that a MR device section of a very small film thickness can be formed because they do not require an anti-ferromagnetic film. Class B GMR films are characterized in that a wide variety of magnetic films can be adopted for the magnetic films because they incorporate a magnetic film which is pinned by an anti-ferromagnetic film and therefore do not require a hard magnetic film having a magnetization curve with a good square feature as in the case of Class A materials.

Furthermore, by inserting an interface magnetic film mainly composed of Co (thickness: 0.1 nm) on at least one of the interfaces between the respective magnetic films and the non-magnetic film in a GMR film of Class A or Class B, the scattering of spin at such an interface can be enhanced so that the GMR film exhibits a greater change in the MR properties. In the case where such an interface magnetic film is inserted between a soft magnetic film and a non-magnetic film, it is preferable that the interface magnetic film have a thickness in the range of about 0.1 nm to about 1.5 nm because the soft magnetic properties of the soft magnetic film will deteriorate as the thickness of the interface magnetic film exceeds about 1.5 nm.

To the extent that the shield gap length allows, the MR device section can be provided within the shield gap so as to be interposed between insulating films. In embodiments where the shield gap length is required to be very small, the MR device section can be coupled to metal shield films via non-magnetic conductive films.

A MR device section having good sensitivity can be obtained by employing a soft magnetic film which is composed mainly of $Ni_xCo_yFe_z$ (where x=about 0.6 to about 0.9; y=about 0 to about 0.4; and z=about 0 to about 0.3 in terms of atomic composition) in the above-mentioned GMR film.

A MR device section exhibiting a relatively large MR change rate can be obtained by employing a soft magnetic film which is composed mainly of $Ni_{x'}Co_{y'}Fe_{z'}$ (where x'=about 0 to about 0.4; y'=about 0.2 to about 0.95; and z'=about 0 to about 0.5 in terms of atomic composition) in the above-mentioned GMR film.

A MR device section exhibiting both soft magnetic properties and GMR characteristics at a thin film thickness can be obtained by employing CoMnB, CoFeB or the like (which are amorphous magnetic films) as a soft magnetic film. The use of CoNbZr will not in itself result in a large MR ratio, but when combined with an interface magnetic film, this can provide a substantially larger MR ratio with excellent overall soft magnetic properties. Such materials can also be employed in a multilayer structure including a NiFeCo type soft magnetic film described above.

Herein, the MR ratio is defined by the following equation:

$$MR\ ratio\ (\%) = (R(maximum) - R(minimum))/R(minimum) \times 100$$

As a non-magnetic insulating film, a stable and insulating film with a fine and dense structure can be suitably used, e.g., a thin Al oxide film.

As for the hard magnetic film, employing a material that mainly contains Co will result in a large MR change rate. It is preferable that the square feature of the hard magnetic film (defined as remnant magnetization/saturation magnetization) be 0.7 or more in order to obtain a MR device section having good linearity and a large MR change rate.

In this specification, a magnetic film having a coercive force of 100 Oe or more is referred to as a "hard magnetic film", and a magnetic film having a coercive force of 20 Oe or less is referred to as a "soft magnetic film".

As an anti-ferromagnetic film, a conductive metal film is required. Examples of preferable conductive metal films include NiMn, IrMn, PtMn, and CrMn. FeMn is not preferable in terms of resistance to corrosion. Oxide films are not suitable for the head structure of the present invention because an oxide anti-ferromagnetic film provides a high resistance.

Hereinafter, the present invention will be described by way of specific examples.

EXAMPLE 1

A lower shield layer of Fe—Si—Al was formed on a substrate by sputtering. Next, a conductive film of Cu (thickness; about 20 nm) was formed on the Fe—Si—Al film. Furthermore, a MR film having a multilayer structure of $Co_{0.84}Nb_{0.12}Zr_{0.04}$ (thickness: about 5 nm)/$Ni_{0.68}Fe_{0.20}Co_{0.12}$ (thickness: about 10 nm)/$Co_{0.90}Fe_{0.10}$ (thickness: about 1 nm)/$Al_2O_3$ (thickness: about 2 nm)/$Co_{0.50}Fe_{0.50}$ (thickness: about 4 nm) was formed on the Cu conductive film. A conductive film of Cu (thickness: about 20 nm) was further formed on the multilayer MR film by sputtering. After this MR film was patterned into a MR device section shown in FIG. 1 (in this case, the distance between the head surface and the magnetic film M1 was about 1 $\mu$m), an insulating film of $Si_3N_4$ (thickness: about 100 nm) was formed by reactive sputtering. After through-holes were made in the MR device section, an upper shield layer of Fe—Si—Al was formed by sputtering. Thus, a MR head according to the present invention was constructed.

The thickness of the insulating film I extending between the head surface S and the magnetic layer M1 (denoted by di in FIG. 1) is about 1 $\mu$m, depending on the anti-friction properties of the insulating film I. In the case where the insulating film I has excellent anti-friction properties, the thickness di can be less than about 1 $\mu$m.

Figure 2:
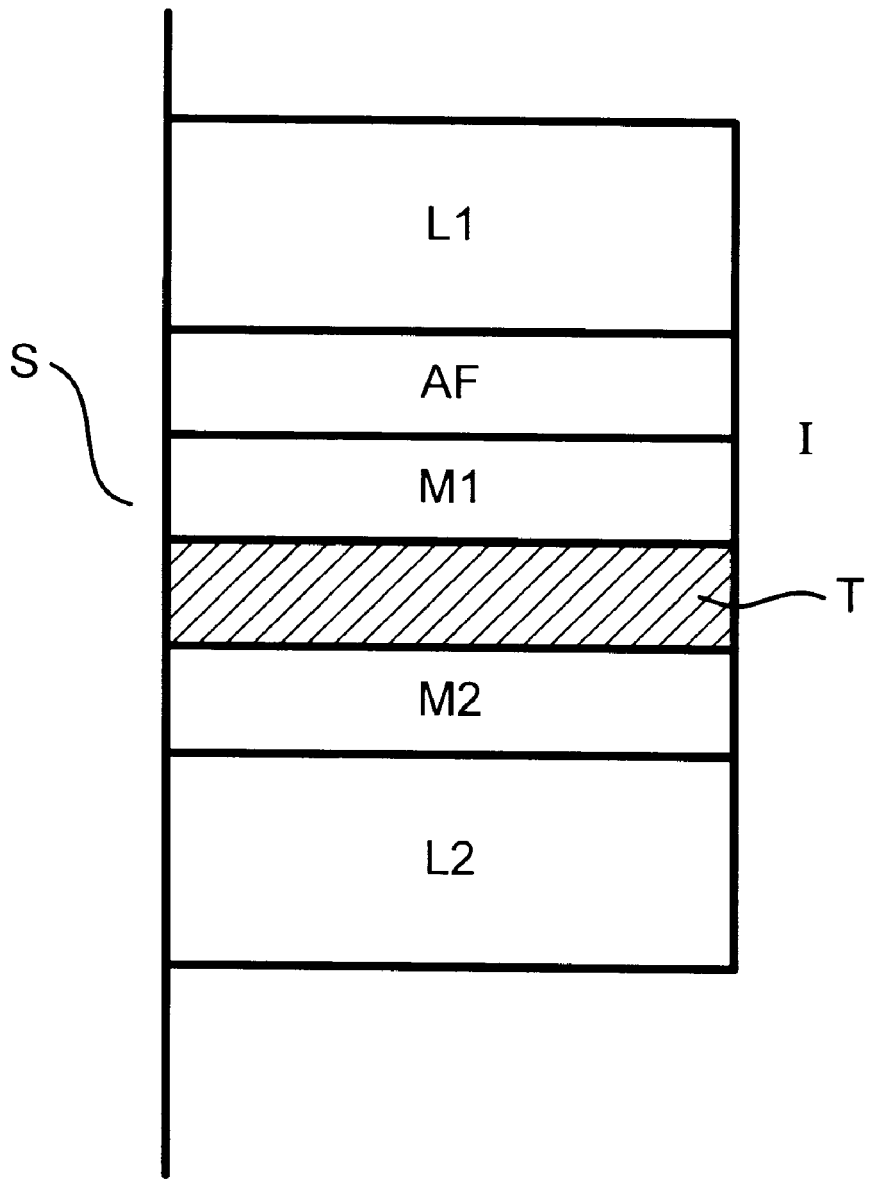
FIG. 2 is a diagram illustrating an exemplary MR device section in a known thin film magnetic head.
Figure 3:
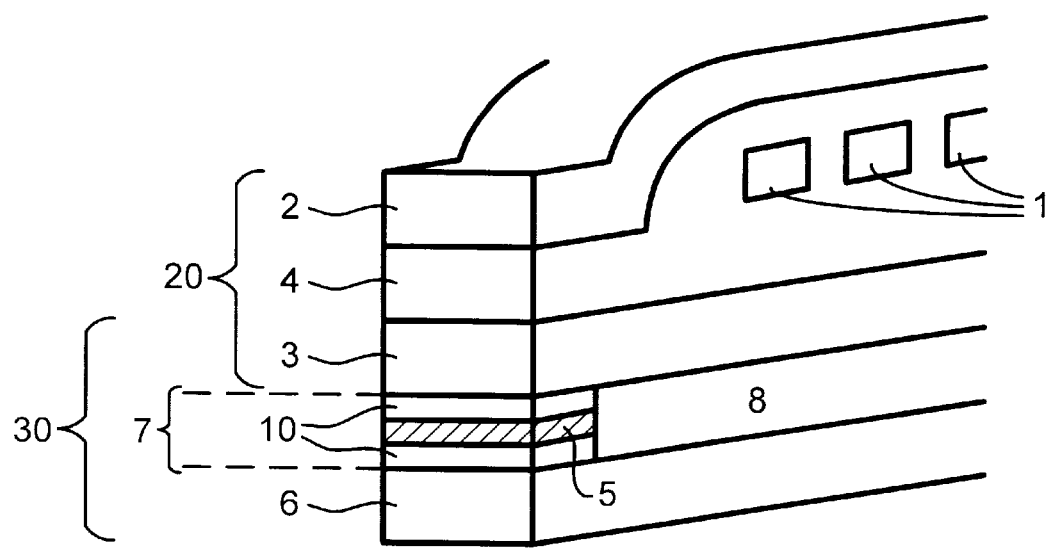
FIG. 3 is a diagram illustrating an exemplary known thin film magnetic head in which a MR device section and shield sections are interconnected by conductive layers.
Figure 4:
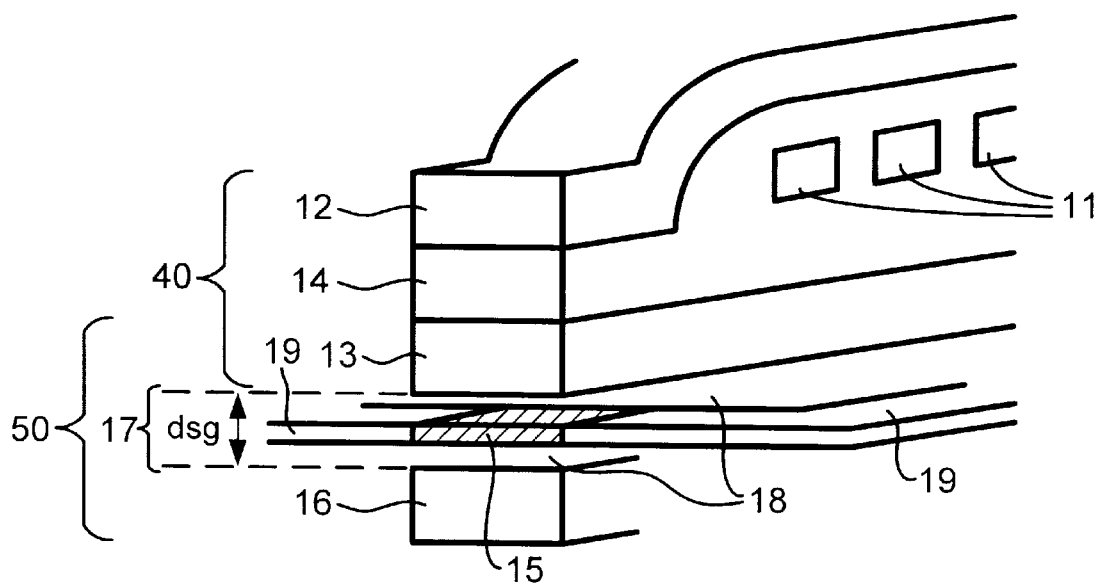
FIG. 4 is a diagram illustrating an exemplary conventional thin film magnetic head.

For comparison, a MR head including a conventional MR device section having the structure shown in FIG. 2 was constructed by a similar method.

The reproduction output characteristics of both heads constructed as above were measured, which revealed that the MR head of the inventive structure shown in FIG. 1 provides stably high output power characteristics, whereas the MR head of the comparative structure shown in FIG. 2 initially provides high output power but the output power subsequently becomes unstable, indicative of deterioration in the characteristics.

EXAMPLE 2

A lower shield layer of Fe—Si—Al was formed on a substrate by sputtering. Next, a conductive film of Cu (thickness: about 20 nm) was formed on the Fe—Si—Al film. Furthermore, a MR film having a multilayer of $Ni_{0.68}Fe_{0.20}Co_{0.12}$ (thickness: about 10 nm)/$Co_{0.90}Fe_{0.10}$ (thickness: about 1 nm)/$Al_2O_3$ (thickness: about 2 nm)/Co (thickness: about 5 nm)/$Ir_{0.20}Mn_{0.80}$ (10 nm) was formed on the Cu conductive film. A conductive film of Cu (thickness: about 20 nm) was further formed on the MR film by sputtering. After this MR film was patterned into a MR device section shown in FIG. 1, an insulating film of $Si_3N_4$ (thickness: about 100 nm) was formed by reactive sputtering. After throughholes were made in the MR device section, an upper shield layer of Fe—Si—Al was formed by sputtering. Thus, a MR head according to the present invention was constructed.

For comparison, a MR head including a conventional MR device section having the structure shown in FIG. 2 was constructed by a similar method.

The reproduction output characteristics of both heads constructed as above were measured, which revealed that the MR head of the inventive structure shown in FIG. 1 provides stably high output power characteristics, whereas the MR head of the comparative structure shown in FIG. 2 initially provides high output power but the output power subsequently becomes unstable, indicative of deterioration in the characteristics.

As described above, the present invention provides a highly reliable thin film magnetic head with an extremely small shield gap length.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A thin film magnetic head comprising a shield-type magnetoresistance effect (MR) head section including:

an MR device section with a shield gap, the MR device section exhibiting a giant magnetoresistance effect; and a first lead and a second lead disposed in such a manner that an electric current flows in a direction which is both perpendicular to a film surface of the MR device section and parallel to a medium surface, wherein the MR device section comprises first and second magnetic films with a non-magnetic insulating film interposed therebetween, the first magnetic film exhibiting soft magnetic properties and being disposed at a first distance from a face of the thin film magnetic head opposing a magnetic recording medium, and the second magnetic film being disposed at a second distance from the face of the thin film magnetic head opposing the magnetic recording medium such that the second distance is greater than the first distance.

2. A thin film magnetic head according to claim 1 comprising upper and lower shield metal magnetic films, each of the upper and lower shield metal magnetic films being connected to the MR device section by a non-magnetic conductive film, the upper and lower shield metal magnetic films functioning as a portion of the lead for allowing an electric current to flow into the MR device section.

3. A thin film magnetic head according to claim 1, wherein the second magnetic film is magnetically coupled to an anti-ferromagnetic film.

4. A thin magnetic head according to claim 3, wherein the anti-ferromagnetic film comprises a metal anti-ferromagnetic film which comprises at least one of NiMn, IrMn, PtMn, and CrMn.

5. A thin film magnetic head according to claim 1, wherein the second magnetic film is a hard magnetic film having a magnetization curve with good square feature, and a direction of a magnetic field to be detected extends in parallel to a magnetization easy axis of the hard magnetic film.

6. A thin film magnetic head according to claim 5, wherein the hard magnetic film has a square feature of about 0.7 or more, the square feature being defined as remnant magnetization/saturation magnetization.

7. A thin film magnetic head according to claim 1, wherein the MR device section further comprises an interface magnetic film on at least one of interfaces between the first and second magnetic films and the non-magnetic film, the interface magnetic film comprising Co and having a thickness of about 0.1 nm or more.

8. A thin film magnetic head according to claim 7, wherein the interface magnetic film is inserted between the first magnetic film and the non-magnetic film, the interface magnetic film having a thickness in the range of about 0.1 nm to about 1.5 nm.

9. A thin film magnetic head according to claim 1, wherein the first film comprises $Ni_xCo_yFe_z$ (where x=about 0.6 to about 0.9; y=about 0 to about 0.4; and z=about 0 to about 0.3 in terms of atomic composition).

10. A thin film magnetic head according to claim 1, wherein the first magnetic film comprises $Ni_{x'}Co_{y'}Fe_{z'}$ (where x'=about 0 to about 0.4; y'=about 0.2 to about 0.95; and z'=about 0 to about 0.5 in terms of atomic composition).

11. A thin film magnetic head according to claim 1, wherein the first magnetic film comprises an amorphous magnetic film.

* * * * *